Dec. 24, 1957  R. B. BEARD  2,817,229
SORBTION GAS ANALYSIS APPARATUS
Filed Oct. 30, 1953
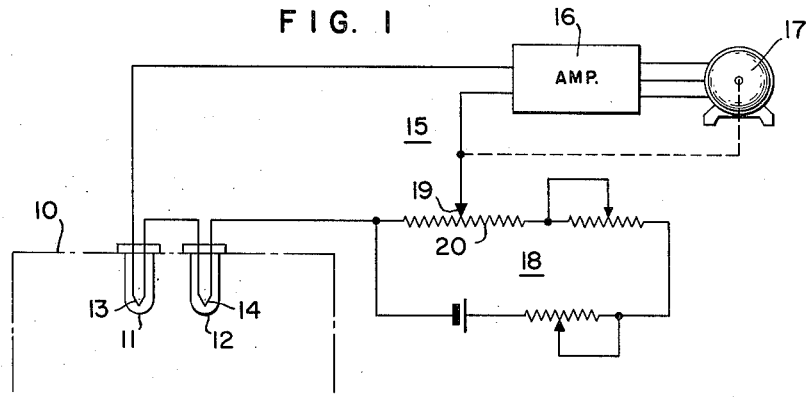
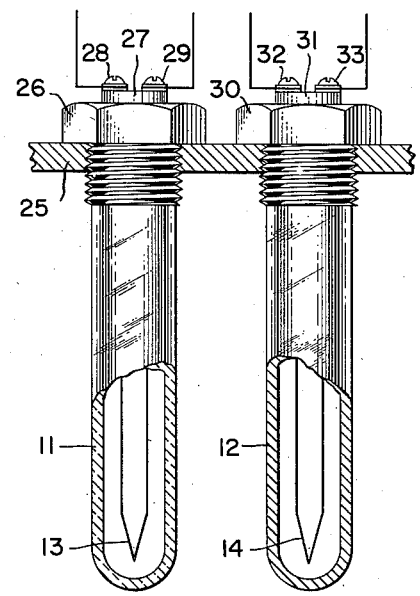
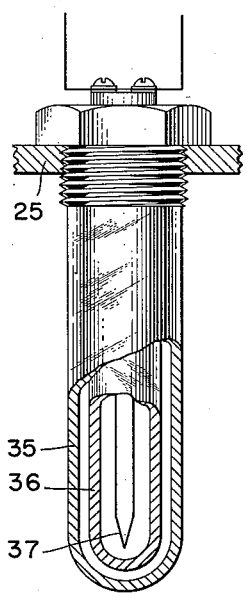
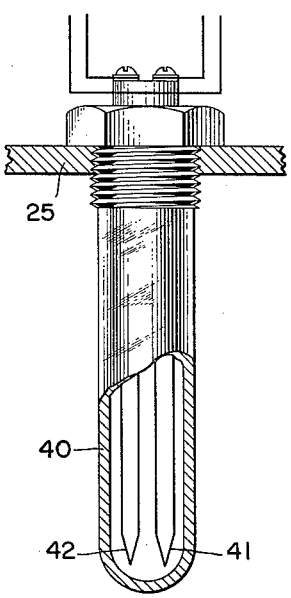
*INVENTOR.*
RICHARD B. BEARD
BY
ATTORNEY.

United States Patent Office 2,817,229
Patented Dec. 24, 1957

2,817,229

SORBTION GAS ANALYSIS APPARATUS

Richard B. Beard, Philadelphia, Pa., assignor to Minneapolis-Honeywell Regulator Company, Minneapolis, Minn., a corporation of Delaware Application October 30, 1953, Serial No. 389,367

8 Claims. (Cl. 73—26)

The general object of the present invention is to provide a new and improved apparatus for measuring the concentration of a constituent of a gaseous atmosphere. More specifically, the invention is concerned with an atmospheric analyzing apparatus which is characterized by its simplicity, accuracy, and its adaptability to standard electrical measuring circuitry.

The accurate analysis of gaseous atmospheres has heretofore generally involved complicated and cumbersome apparatus wherein samples of the particular atmosphere are passed through certain testing and analyzing processes which at best give only approximate indications of the desired constituent concentrations. The most accurate investigation of a gaseous atmosphere may be accomplished by placing suitable measuring elements directly into the atmosphere where the atmosphere may be examined directly under desired or selected conditions. It has been found that certain thermoelectric junctions are highly sensitive to certain gaseous constituents because the gaseous constituents are sorbed into the thermoelectric junction and cause the thermoelectric potential of the junction to vary. Analyzing apparatus of the type using this thermoelectric effect will be found in my copending application entitled "Measuring Apparatus," Serial No. 364,760, filed June 29, 1953, now abandoned. This type of apparatus is suitable for use in many atmospheres, however, certain types of thermal junctions will react with more than one constituent of the atmosphere under examination. This necessitates isolating certain of the constituents of the atmosphere from the thermal junctions used in the measuring apparatus. This isolation may be accomplished effectively directly in the atmosphere where the measurement is to be made so that the atmosphere ambient conditions will be present at the point of measurement. This isolation may be accomplished by using a suitable closed space having as an inlet a highly selective gaseous permeable member. In some instances, more than one gaseous constituent may permeate into the space in which instance additional compensation must be added. The gaseous permeable member will establish in the closed space a constituent pressure which will correspond to the partial pressure of that constituent in the atmosphere under examination so that the placement of a suitable sensitive thermoelectric junction within the space will provide an accurate indication of the constituents being measured.

It is therefore a more specific object of the present invention to provide an atmospheric analyzing apparatus which includes a gaseous constituent sensitive thermoelectric junction positioned within a space having as an inlet a highly selective gaseous permeable member.

Another more specific object of the present invention is to provide a new and improved measuring apparatus comprising a highly selective gaseous permeable tube adapted to project into an atmosphere wherein a constituent of the atmosphere is to be measured and wherein said tube has mounted therein a thermoelectric junction which is highly sensitive to the constituent of the atmosphere to be measured.

Still another more specific object of the present invention is to provide a new and improved gaseous measuring apparatus having a first thermoelectric junction positioned within a space having as an inlet a highly selective gaseous permeable member and a second thermoelectric junction positioned within a second space which is enclosed by a gaseous impervious member.

A further more specific object of the present invention is to provide a gaseous atmosphere analyzing apparatus which includes a space having as an inlet a highly selective gaseous permeable member and a pair of thermoelectric junctions which are sensitive to different constituents of the gases permeating through the inlet to the space with one of the junctions providing compensation for unwanted constituents present within the space.

The various features of novelty which characterize the invention are pointed out with particularity in the claims annexed to and forming a part of the specification. For a better understanding of the invention, its advantages, and specific objects attained with its use, reference should be had to the accompanying drawings and descriptive matter in which there is illustrated and described preferred embodiments of the invention.

Of the drawings:

Fig. 1 is a schematic showing of the present apparatus used with an electrical measuring circuit;

Fig. 2 is a view of a pair of sensing elements used in the present apparatus;

Fig. 3 is a modified form of sensing apparatus adapted for use in particular gaseous atmospheres; and Fig. 4 is a further modified form of apparatus incorporating the compensating element directly in the measuring unit.

Referring first to Fig. 1, the numeral 10 represents an enclosure which contains an atmosphere having one or more constituents which are to be measured. The enclosure 10 may well be a metal heat treating furnace or some other processing atmosphere. Projecting into the enclosure 10 are a pair of elements 11 and 12. The element 11 is formed of a gaseous impervious material so that the space therein will be free of the gases in the enclosure 10. The element 12 is preferably formed of a highly selective gaseous permeable member which, through the process of sorption, will establish on the inner space thereof a pressure which is the same as the partial pressure of the particular constituent in the enclosure 10 which is to be measured. As used herein "sorb" means to take up and hold by absorption or adsorption.

The theory of operation of the apparatus of this invention is as follows. The gas whose presence is to be detected contacts the surface of a thermoelectric junction and upsets the space lattice structure of it. This upset causes a change in the output potential or E. M. F. of the thermoelectric junction directly because of this change in the space lattice structure.

Positioned within the element 11 is a thermoelectric junction 13 which will respond to the ambient temperature conditions existing within the enclosure 10. A further thermoelectric junction 14 is placed within the element 12 and this junction is selected to be highly sensitive to the particular atmosphere constituent which is present within the element 12.

These thermocouples 13 and 14 are suitably interconnected to an electrical measuring circuit 15 which may well be of the self-balancing potentiometric type of apparatus disclosed in the patent to Walter P. Wills, Patent No. 2,423,540, issued July 8, 1947. As shown, this apparatus may comprise a suitable amplifier 16, a reversible motor 17, which is driven by the amplifier 16, and a balancing bridge 18 which has a balancing slider 19 movable over an associated slidewire resistor 20. The potential of the slider 19 is compared with the net potential from the thermocouples 13 and 14.

The apparatus of Fig. 1 represents one manner in which the electrical elements of the measuring apparatus may be associated. In this configuration, the thermocouple 13 is sensitive only to the temperature conditions existing within the enclosure 10. The thermoelectric junction of thermocouple 14 will be sensitive to the particular constituent which has permeated through the protective element 12 and the output of this thermocouple will be proportional to the concentration or pressure of the constituent within the element 12. As the thermoelectric junction 14 is temperature sensitive as well as gaseous sensitive, it is necessary to provide appropriate temperature compensation to eliminate the effects of the temperature on the thermocouple. This is accomplished by the thermocouple 13 which, as shown in the figure is connected directly in series with the thermocouple 14 and the connection is so arranged as to eliminate the temperature effects originating in the thermocouple 14 so that the instrument or measuring circuit 15 will see only a potential which is proportional to the constituent concentration or partial pressure of the constituent within the element 12. If the electrical potential from the output of the thermocouples 13 and 14 is not the same as the electrical potential on the slider 19, the amplifier will detect the unbalance and cause the motor 17 to drive the slider to a balance position. The balance position will be an indication of the concentration of the particular constituent of the atmosphere. If desired, the output of the amplifier 16 and motor 17 may be used in any desired manner for controlling the atmosphere within the enclosure 10.

The temperature compensation used in Fig. 1 is illustrative only as it will be apparent that thermocouples 13 and 14 should be matched if compensation is to be effected in the circuit shown. If the thermocouples are not matched, additional circuitry, well known in the art, may be used so that the net electrical signal fed into the amplifier will be due solely to the potential caused by the constituent acting on the thermocouple 14.

Referring now to Fig. 2, the sensing elements of the apparatus shown in Fig. 1 are shown in greater detail. The elements shown in Fig. 2 are shown as elongated hollow tubes and bear the same reference numerals as in Fig. 1. The tube 11 is preferably of fused silica so as to be effectively completely impervious to all gases within the enclosure 10. The tube 11 is shown to threadedly engage a suitable mounting plate 25 with a tightening head projection 26 arranged for tightening the tube 11 down into position in the mounting plate 25. The terminal block 27 is provided on the top of the head 26 and this block may well contain a pair of electrical terminals 28 and 29. The terminals 28 and 29 are connected to the individual elements of the temperature sensitive thermocouple 13.

The tube 12 is preferably formed of a highly selective permeable metal. In the case of hydrogen, the tube 12 should preferably be formed of palladium or platinum. Palladium and platinum are both highly selective in their permeability to hydrogen. The thermocouple 14 which is positioned within the tube 12 is likewise formed of gaseous sensitive elements. The hydrogen within the tube 12 may be detected by a thermocouple of the platinum-platinum plus rhodium type. Another form of thermocouple which is suitable for use in hydrogen measurement is a platinum-palladium thermocouple. If a platinum-platinum plus rhodium thermocouple is used in the thermocouple 14, a similar thermocouple may well be used for the thermocouple 13 since both thermocouples will be sensitive in the same manner to ambient temperature conditions. However, the thermocouple 13 may be formed of other elements such as chromel-Alumel or nickel-nickel plus 18% molybdenum. If the latter forms of thermocouple are used for thermocouple 13, the ratio of the temperature compensation with respect to the thermocouple 14 may have to be varied by suitable electrical circuitry in order for there to be obtained completed temperature compensation.

If the apparatus of Fig. 2 is to be used to measure oxygen concentration, the tube 12 should preferably be formed of silver which has a high selective permeability to the oxygen within the enclosure 10. The thermocouple to be used in this instance should be an oxygen sensitive thermocouple such as a nickel-nickel plus 18% molybdenum couple or an iron-constantan thermocouple. It will be obvious that there are other thermocouples which will suitably respond to the presence of oxygen. Temperature compensation in this arrangement is best effected by having a matching thermocouple in the impervious tube 11.

In the event the apparatus shown in Fig. 2 is to be used in conjunction with oxygen measurement in an atmosphere containing sulfur constituents, it is necessary to provide some additional means for protecting the oxygen permeable tube. This additional protection is effected in Fig. 3 by the provision of an additional tube 35. The tube 35 may well be formed of nickel or low carbon steel and this tube will be effective to pass the oxygen in the atmosphere as well as some of the other constituents of the atmosphere, but will not permit the sulphides or sulphates of the atmosphere to permeate therethrough to affect the silver tube 36. An oxygen sensing thermocouple 37 may suitably be positioned within the tube 36 as has been mentioned above for the oxygen sensing thermocouple to be used in Fig. 2. In other respects, the apparatus corresponds to the apparatus shown in Fig. 2 and may conveniently be used with suitable temperature compensating means connected into an electrical circuit of the type shown in Fig. 1.

If it is desirable to determine the concentration of carbon monoxide in an atmosphere, the apparatus of Fig. 4 may conveniently be used. Here, the selectively permeable element 40 may be formed of a mild steel through which the carbon monoxide will pass. Positioned within the tube 40 are a pair of thermocouples 41 and 42. The thermocouple 41 may be a nickel-nickel plus 18% molybdenum couple which will be affected by the carbon monoxide changing the thermoelectric potential thereof. As the mild steel tube 40 will also pass nitrogen present in the atmosphere, the presence of nitrogen will necessitate the provision of a compensating thermocouple such as the couple 42. This couple may be of the platinum-platinum plus tantalum type.

The thermocouple 41 may also be selected to be of the iron-constantan type. As this type of couple is sensitive to hydrogen and nitrogen, it is desirable to compensate for both the hydrogen and nitrogen by means of the thermocouple 42. This compensation may be accomplished by a palladium-palladium plus tantalum impurity type couple.

As with the electrical measuring circuits of Figs. 2 and 3, the circuit of Fig. 4 may be connected in any desired manner into the measuring circuit of an apparatus such as shown in Fig. 1 with the connections being such as to compensate for temperature, nitrogen, and hydrogen. While the apparatus has been discussed with nitrogen and hydrogen as the unwanted constituents within the tube 40, it will be readily apparent that other constituents may be present in the atmosphere depending upon the particular atmosphere being analyzed. In this instance, other suitable sensitive thermocouples may be used to compensate for and eliminate the effects of these unwanted constituents.

It will be further obvious that the present invention is adapted for use in gaseous measuring problems other than the specific ones which have been set forth above by way of illustration and example.

While, in accordance with the provisions of the statutes, there has been illustrated and described preferred embodiments of the invention, those skilled in the art will understand that changes may be made in the form of the apparatus disclosed without departing from the spirit of the invention as set forth in the appended claims, and that some features of the present invention may be used to advantage without a corresponding use of other features.

Having now described my invention, what I claim as new and desire to secure by Letters Patent is:

1. Means for detecting the concentration of a gas in a heated gaseous atmosphere, said means including in combination, a first hollow element located in said atmosphere and substantially impermeable to said gas, a first thermoelectric junction located in the hollow in said first element and protected from contact with said gas by said first element and responsive to the temperature of said atmosphere, a second hollow element located in said atmosphere adjacent said first element and containing a second thermoelectric junction in the hollow therein and having at least a portion permeable to at least said gas and impermeable to gas which would contaminate said second thermoelectric junction, said second thermoelectric junction being sorbtive of said gas and responsive to the temperature of said atmosphere and responsive to said sorbed gas, and a measuring electric circuit in which said junctions are connected in such a way as to eliminate responses of said junctions due to temperature and to conduct the variation in potential caused by said sorbed gas on said second thermoelectric junction, said conduction of said potential causing said electric circuit to perform its measuring operation.

2. Means for detecting the concentration of a gas in a heated gaseous atmosphere, said means including in combination, a first hollow tube located in said atmosphere and formed of a material substantially impermeable to said gas, a first thermoelectric junction located in the hollow in said first tube and protected from contact with said gas by said first tube and responsive to the temperature of said atmosphere, a second hollow tube located in said atmosphere adjacent said first tube and containing a second thermoelectric junction in the hollow therein and having at least a portion which is highly selectively permeable to the gas whose concentration is to be measured and highly selectively impermeable to gas which would contaminate said second thermoelectric junction and would render its output potential irregular, said second thermoelectric junction being sorbtive of said gas and changing in output potential in response to said sorbed gas, and a measuring electric circuit in which said junctions are connected in such a way that the changes in the potential put out by one of said junctions oppose the changes in the potential put out by the other of said junctions and the change in the potential put out by said second junction in response to said sorbed gas causes said electric circuit to perform its measuring operation.

3. Apparatus for measuring the concentration of a constituent of a heated gaseous atmosphere, including, a first element having a hollow chamber therein and substantially impermeable to said constituent, a temperature-compensating thermoelectric junction in said chamber, a second element exposed to the same temperature as said first element and having a hollow chamber therein and having at least a portion permeable to at least said constituent and impermeable to a contaminating gas, said portion providing an inlet for said constituent to said chamber, a constituent-measuring thermoelectric junction in said chamber in said second element and including a metal which will sorb the constituent which passes through said permeable portion, and means interconnecting both of said thermoelectric junctions to a junction-potential-measuring apparatus so that the potential measured by said measuring apparatus is compensated for the temperature to which said elements are exposed.

4. For measuring the concentration of hydrogen in a heated gaseous atmosphere, apparatus including, a first elongated hollow tube formed of a material impermeable to hydrogen and adapted to be exposed on one surface to an atmosphere containing the hydrogen to be measured, a first thermoelectric junction positioned within said first tube and having an output potential proportional to the temperature within said first tube, a second elongated hollow tube formed at least in part of a hydrogen-permeable metal and adapted to be exposed on one surface to said atmosphere containing the hydrogen to be measured and adjacent said first tube, a hydrogen-sensitive thermoelectric junction positioned within said second tube and formed of metallic substances having a space lattice structure which is upset by contact with hydrogen, said upset in lattice structure causing a variation in the output potential of said hydrogen-sensitive junction which is proportional to the hydrogen pressure within said second tube, and measuring means connected to and responsive to the potentials of both of said thermoelectric junctions to eliminate the effects of hydrogen-containing atmospheric temperature upon said hydrogen-sensitive thermoelectric junction.

5. Apparatus as described in claim 4 wherein said first tube is composed of fused silica.

6. For measuring the concentration of oxygen in a heated gaseous atmosphere, apparatus including, a first elongated hollow tube formed of a material impermeable to oxygen and adapted to be exposed on one surface to an atmosphere containing the oxygen to be measured, a first thermoelectric junction positioned within said first tube and sensitive to the temperature conditions therein, a second elongated hollow tube formed at least in part of an oxygen-permeable metal and including silver as a component thereof, an oxygen-sensitive thermoelectric junction positioned within said second tube and formed of metallic substances having a space lattice structure which is upset by contact with oxygen, said upset in lattice structure causing a variation in the output potential of said oxygen-sensitive junction which is proportional to the oxygen pressure within said second tube, both of said tubes being positioned within a common space wherein the oxygen concentration is to be determined, and means interconnecting both of said thermoelectric junctions to a potential-measuring apparatus so as to eliminate the effects of the temperature of the oxygen-containing atmosphere upon said oxygen-sensitive thermoelectric junction.

7. Apparatus according to claim 6 including a third elongated hollow tube composed of nickel or low carbon steel and interposed between said second tube and the oxygen-containing atmosphere so as to pass the oxygen in said atmosphere to said second tube and not to pass sulphides or sulphates in said atmosphere to said second tube and contaminate said second tube.

8. For determining the amount of a constituent present in a heated gaseous atmosphere, measuring apparatus including, walls surrounding a chamber, a member forming a portion of said walls and relatively permeable by said constituent so as to admit said constituent to said chamber and relatively impermeable by other constituents of said atmosphere so as to exclude said other constituents from said chamber, a thermoelectric junction located in said chamber and formed of metallic substances having a space lattice structure which is upset by sorbtion of said constituent which has permeated through said member into said chamber, said upset in lattice structure causing a variation in the output potential of said thermoelectric junction which variation has a portion which is proportional to the partial pressure of said constituent in said chamber, a measuring electric circuit having an output constituting a measurement and in which measuring circuit said thermoelectric junction is connected in such a way that the variation in the potential put out by said thermoelectric junction causes said electric circuit to perform its measuring function, and means responsive to the temperature of said heated gaseous atmosphere to modify the output of said measuring electric circuit, whereby said measuring electric circuit measures only that portion of the variation in the potential put out by said thermoelectric junction due to the amount of said constituent sorbed by the metallic substances constituting said thermoelectric junction.

References Cited in the file of this patent

UNITED STATES PATENTS

| | | |
|---|---|---|
| 1,174,631 | Snelling | Mar. 7, 1916 |
| 1,321,063 | Lamb et al. | Nov. 4, 1919 |
| 1,559,461 | Ruben | Oct. 27, 1925 |
| 1,779,569 | Thompson | Oct. 28, 1930 |
| 2,279,231 | Gier, Jr. | Apr. 7, 1942 |
| 2,400,940 | McCollum | May 28, 1946 |
| 2,423,540 | Wills | July 8, 1947 |
| 2,456,163 | Watson | Dec. 14, 1948 |
| 2,526,038 | Nelson | Oct. 17, 1950 |
| 2,541,857 | Besselman et al. | Feb. 13, 1951 |
| 2,619,409 | Spracklen | Nov. 25, 1952 |
| 2,671,336 | Hulsberg | Mar. 9, 1954 |
| 2,671,337 | Hulsberg | Mar. 9, 1954 |

OTHER REFERENCES

Metals Reference Book, C. J. Smithells, published by Interscience Publishers Inc. N. Y. C., 1949, pages 387, 388.